United States Patent
Hasegawa et al.

(10) Patent No.: US 10,620,838 B2
(45) Date of Patent: *Apr. 14, 2020

(54) RECLAMATION OF STORAGE MEDIUM

(71) Applicant: INTERNATIONAL BUSINESS MACHINES CORPORATION, Armonk, NY (US)

(72) Inventors: Tohru Hasegawa, Koto-ku (JP); Masayuki Iwanaga, Urayasu (JP); Yutaka Oishi, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 42 days.

This patent is subject to a terminal disclaimer.

(21) Appl. No.: 15/976,257

(22) Filed: May 10, 2018

(65) Prior Publication Data

US 2018/0260133 A1   Sep. 13, 2018

Related U.S. Application Data

(63) Continuation of application No. 14/813,191, filed on Jul. 30, 2015, now Pat. No. 10,042,556.

(51) Int. Cl.
*G06F 3/06* (2006.01)
(52) U.S. Cl.
CPC ............ *G06F 3/0608* (2013.01); *G06F 3/065* (2013.01); *G06F 3/0686* (2013.01)
(58) Field of Classification Search
CPC ....... G06F 3/0608; G06F 3/065; G06F 3/0686
See application file for complete search history.

(56) References Cited

U.S. PATENT DOCUMENTS

| | | | |
|---|---|---|---|
| 5,608,865 A | 3/1997 | Midgely et al. |
| 5,778,391 A | 7/1998 | Fisher et al. |
| 7,103,731 B2 | 9/2006 | Gibble et al. |
| 8,082,388 B2 | 12/2011 | Bello et al. |
| 8,654,476 B2 | 2/2014 | Katagiri et al. |
| 8,751,768 B2 | 6/2014 | Malige et al. |
| 8,935,469 B2 | 1/2015 | Haustein et al. |
| 2002/0188592 A1 | 12/2002 | Leonhardt et al. |
| 2006/0010150 A1 | 1/2006 | Shaath et al. |
| 2006/0288048 A1 | 12/2006 | Kamohara et al. |
| 2010/0121828 A1 | 5/2010 | Wang |

(Continued)

OTHER PUBLICATIONS

IBM, Appendix P, List of IBM Patents or Patent Applications Treated as Related, dated May 14, 2018, 2 pages.

(Continued)

*Primary Examiner* — Nanci N Wong
(74) *Attorney, Agent, or Firm* — William H. Hartwell

(57) ABSTRACT

Software for reclaiming a storage medium. The software determines that a first storage medium storing data in a linear tape file system (LTFS) format meets a predetermined condition indicating that the first storage medium should be reclaimed. Responsive to reading requested data from the first storage medium, and responsive to determining that the first storage medium meets the predetermined condition, the software writes the requested data to a second storage medium in the LTFS format. Subsequent to writing the requested data to the second storage medium, the software reconciles the first storage medium to delete expired data. Subsequent to reconciling the first storage medium, the software explicitly reclaims remaining data on the first storage medium to the second storage medium in the LTFS format.

20 Claims, 7 Drawing Sheets

(56) References Cited

U.S. PATENT DOCUMENTS

| | | |
|---|---|---|
| 2010/0185793 A1 | 7/2010 | Muroyama |
| 2011/0238929 A1 | 9/2011 | Itoh |
| 2011/0299317 A1 | 12/2011 | Shaeffer et al. |
| 2012/0124307 A1 | 5/2012 | Ashutosh et al. |
| 2012/0163150 A1 | 6/2012 | Itagaki et al. |
| 2012/0239990 A1 | 9/2012 | Mataya et al. |
| 2014/0078609 A1 | 3/2014 | Ballard |
| 2014/0337571 A1 | 11/2014 | Sims et al. |
| 2017/0031603 A1 | 2/2017 | Hasegawa et al. |

OTHER PUBLICATIONS

"IBM LTFS Enterprise Edition Version 1.1 enables efficient management and performance of tape as a storage tier", IBM United States Software Announcement 213-203, Jun. 10, 2013, p. 1 of 21, <http://www-01.ibm.com/common/ssi/cgi-bin/ ssialiasinfotype=an&subtype=ca&appname=gpateam&supplier=897&letternum=ENUS213-203>.

United States software list prices, 213-203, dated Jun. 10, 2013, IBM United States Prices, p. 1 of 1, <http://www-01.ibm.com/common/ssi/rep_ca/3/897/ENUS213-203/ENUS-213-203-LIST_PRICES_2013_06_10.PDF>.

RECLAMATION OF STORAGE MEDIUM

BACKGROUND

The present invention generally relates to storage systems, and more particularly to reclamation of storage media in storage systems.

A linear tape file system (LTFS) is software that allows for performing standard file operations to tape media (a type of sequential access media) and providing an intuitive interface to users to manipulate files or directories on the tape media. Several implementations of LTFS have been developed for tape drives and tape libraries. Hierarchical storage systems integrating a clustered file system with LTFS have been also developed, in which part of files in the clustered system are stored on tape media in the LTFS format.

Although LTFS can present tape media as disk-like drives, a tape medium may not allow for random accessing as the tape medium is sequential in nature. New data may be appended to the tape medium. Data deletions may just erase pointers to the data. As such, space on the tape medium that is occupied by deleted data may not be reused during normal operations.

Reclamation is a process by which active data on one or more tape media are consolidated onto another tape medium by reading the active data stored in a source tape medium and writing the read data into a destination tape medium. The reclamation process can be performed so that all active data stored in the source tape medium with low usage is moved to another tape medium to improve overall tape usage, for instance. The reclaimed tape medium becomes a scratch tape where no active data remains and can be reformatted to reuse. The reclamation can be performed so that all active data stored in the source tape medium is moved to another tape medium that has different recording density and/or different transfer rate due to difference in generations between these tape media, for example.

SUMMARY

According to an aspect of the present invention, there is a method, computer program product and/or system for reclaiming a storage medium by performing the following operations (not necessarily in the following order): (i) determining that a first storage medium storing data in a linear tape file system (LTFS) format meets a predetermined condition indicating that the first storage medium should be reclaimed, wherein the predetermined condition is a policy based, at least in part, on a generation of the first storage medium and on a utilization of the first storage medium, and wherein the predetermined condition is met when the generation of the first storage medium is older than a first predetermined threshold and when a percentage of valid capacity for valid files to a total tape capacity of the first storage medium is below a second predetermined threshold; (ii) responsive to reading requested data from the first storage medium, and responsive to determining that the first storage medium meets the predetermined condition, writing the requested data to a second storage medium in the LTFS format, wherein the second storage medium is selected based, at least in part, on a generation of the second storage medium, wherein the generation of the second storage medium is newer than the generation of the first storage medium; (iii) subsequent to writing the requested data to the second storage medium, reconciling the first storage medium to delete expired data; and (iv) subsequent to reconciling the first storage medium, explicitly reclaiming remaining data on the first storage medium to the second storage medium in the LTFS format, wherein a time required for explicitly reclaiming is reduced due to the requested data having already been written to the second storage medium, and due to the deleted expired data not having to be written to the second storage medium.

BRIEF DESCRIPTION OF THE DRAWINGS

The subject matter, which is regarded as the invention, is particularly pointed out and distinctly claimed in the claims at the conclusion of the specification. The forgoing and other features and advantages of the invention are apparent from the following detailed description taken in conjunction with the accompanying drawings in which:

DETAILED DESCRIPTION

During the reclamation process, two drives may be occupied for reading from the source storage medium and for writing to the destination storage medium. Considerable time may be required for the reclamation due to their sequential nature. Thus, what is needed are methods, storage systems and computer program products capable of reducing drive occupation time dedicated for reclamations in the storage system.

The present invention will be described using particular embodiments, and the embodiments described hereafter are understood to be only referred to as examples and are not intended to limit the scope of the present invention.

One or more embodiments according to the present invention are directed to methods, storage systems and computer program products for reclaiming a storage medium in the storage systems.

Now, referring to the series of FIGS. 1-5, there is shown a hierarchical storage system with disk and tape tiers, and a method for reclaiming a tape medium in the hierarchical storage system according to an example embodiment of the present invention.

Figure 1:
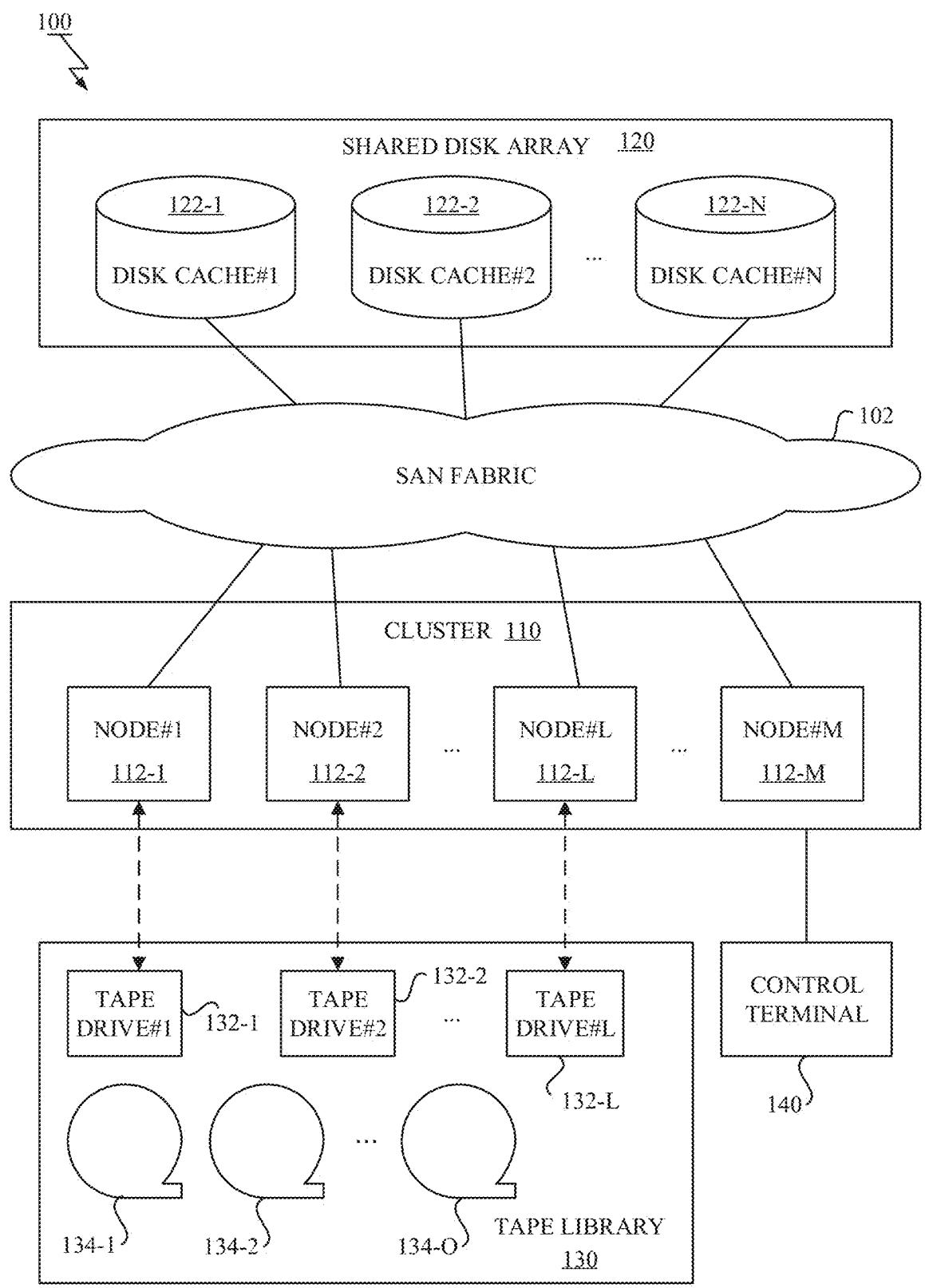
FIG. 1 shows an overview of a hierarchical storage system according to an example embodiment of the present invention.

Referring to FIG. 1, an overview of the hierarchical storage system 100 is shown. The hierarchical storage system 100 includes a cluster 110 with one or more nodes 112-1 through 112-M to provide a file system that allows for performing file operations to the hierarchical storage system 100.

As shown in FIG. 1, the hierarchical storage system 100 may include a shared disk array 120 that includes one or more disk caches 122-1 through 122-N. Each node 112 in the cluster 110 may be connected to the disk cache 122 in the shared disk array 120 via a SAN (Storage Area Network) fabric 102. The SAN fabric may include, but is not limited to, FC (Fibre Channel)—SAN based on a fiber channel network and/or IP (Internet Protocol)—SAN based on TCP (Transmission Control Protocol)/IP network with LAN (Local Area Network) switches.

The nodes 112 may share the disk caches 122. The node 112 can access the disk cache 122 via the SAN fabric 102 and also provide indirect file access to other nodes that do not connect to the SAN fabric 102. The file system distributed to the one or more nodes 112 in the cluster 110, to which plurality of nodes (may include client nodes) can access, is called a clustered file system or a distributed parallel file system. The clustered file system can provide a global namespace, a striping functionality to stripe input and output over the nodes and an information lifecycle management (ILM) functionality.

The clustered file system may include, but is not limited to, GPFS (General Parallel File System), GFS (Global File System), OCFS (Oracle Cluster File System), Luster, GlusterFS, etc. (Note: the term(s) "GPFS," "General Parallel File System," "Oracle," "Luster," and/or "GlusterFS" may be subject to trademark rights in various jurisdictions throughout the world and are used here only in reference to the products or services properly denominated by the marks to the extent that such trademark rights may exist.)

The hierarchical storage system 100 may further include a tape library 130. The tape library 130 includes one or more tape drives 132 and one or more tape media 134. Any tape medium 134 may correspond to a storage medium for both source and destination. Each node 112 in the cluster 110 may be connected to the tape library 130 via SAN fabric, FC LVD (Low Voltage Differential) SCSI (Small Computer System Interface) or SAS (Serial Attached SCSI) cables. The tape library 130 may include a plurality of tape drives 132 to enable the plurality of nodes 112 to access a set of the tape media 134 simultaneously. The tape drive 132 may be occupied by the node at a point in time and may be used alternately. In this embodiment, the tape drives 132 accept preferably LTO (Linear Tape-Open) Ultrium 5 or later tape media, which support LTFS. (Note: the term(s) "LTO," "Linear Tape-Open," and "Ultrium" may be subject to trademark rights in various jurisdictions throughout the world and are used here only in reference to the products or services properly denominated by the marks to the extent that such trademark rights may exist.)

The tape library 130 is managed by a tape file system such as LTFS (Liner Tape File System) and integrated to the clustered file system, so that at least part of data in the shared disk array 120 is stored on tape media 134 in the tape library 130. Files may migrate from the shared disk array 120 to the tape library 130 based on a predetermined migration policy.

The hierarchical storage system 100 may further include a control terminal 140. The control terminal 140 is a terminal device which an administrative user can operate to issue a manual request and to specify settings of the hierarchical storage network. By using the control terminal 140, the administrative user can specify settings of a novel reclamation process according to the example embodiment of the present invention, which will be described in more detail below. The administrative user can also issue a manual request and specify schedules or policies for other functionalities of the hierarchical storage system 100 such as migration, recall, standard reclamation, reconciliation, file placement, file management, etc.

As shown in FIG. 1, in the example embodiment, the nodes 112-1 through 112-M are described to be connected to the disk caches 122-1 through 122-N in the shared disk array 120 and the nodes 112-1 through 112-L are described to be connected to the tape drives 132-1 through 132-L in the tape library 130. However, the configuration of the hierarchical storage system 100 shown in FIG. 1 is only an example of a typical storage system and is not intended to suggest any limitation.

For instance, in a particular embodiment, the shared disk array may be divided to one or more online storages and one or more nearline storages to construct a three or more tiered architecture. In another particular embodiment, the hierarchical storage system may further include a flash storage tier on top of the hierarchical storage system. In other embodiments, the storage system may have merely one node, one disk cache and one tape drive to construct a hierarchical storage system. In other embodiments, another type of a sequential access medium may be used as a storage medium for both source and destination in place of or in addition to the tape medium.

Figure 2:
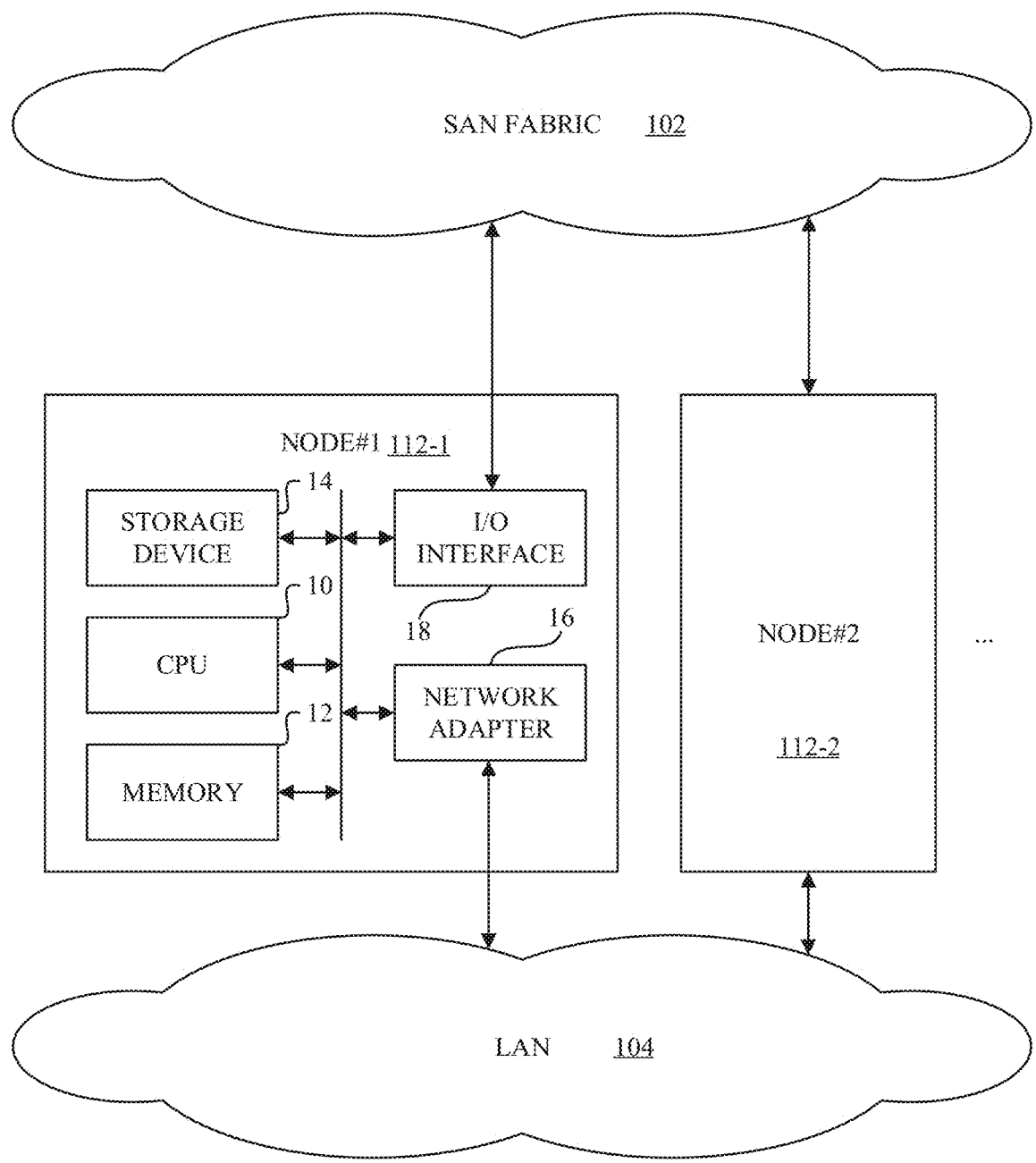
FIG. 2 depicts a node comprising a cluster of the hierarchical storage system according to the example embodiment of the present invention.

Referring now to FIG. 2, a schematic of an example of a node is shown. The node 112 is only one example of a suitable node and is not intended to suggest any limitation as to the scope of use or functionality of embodiments of the invention described herein. Regardless, the node 112 is capable of being implemented and/or performing any of the functionality set forth hereinabove.

The node 112 is operational with numerous other general purpose or special purpose computing system environments or configurations. Examples of well-known computing systems, environments, and/or configurations that may be suitable for use with the node 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The node 112 may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 2, the node 112 is shown in the form of a general-purpose computing device. The components of the node 112 may include, but are not limited to, one or more processors (or processing units) 10 and a memory 12 operatively coupled to the processors 10 by a bus including a memory bus or memory controller, and a processor or local bus using any of a variety of bus architectures.

The node 112 typically includes a variety of computer system readable media. Such media may be any available media that is accessible by the node 112, and it includes both volatile and non-volatile media, and removable and non-removable media.

The memory 12 can include computer system readable media in the form of volatile memory, such as random access memory (RAM). The node 112 may further include other removable/non-removable, volatile/non-volatile computer system storage media. By way of example only, the storage device 14 can be provided for reading from and writing to a non-removable, non-volatile magnetic media. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to a bus by one or more data media interfaces. As will be further depicted and described below, the storage device 14 may include at least one program product having a set (e.g., at least one) of program modules that are configured to carry out the functions of embodiments of the invention.

Program/utility, having a set (at least one) of program modules, may be stored in the storage device 14 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

The node 112 may also communicate with one or more peripherals such as a keyboard, a pointing device, etc.; a display; one or more devices that enable a user to interact with the node 112; and/or any devices (e.g., network card, modem, etc.) that enable the node 112 to communicate with one or more other computing devices via SAN fabric 102. Such communication can occur via Input/Output (I/O) interfaces 18. Still yet, the node 112 can communicate with one or more networks such as a local area network (LAN) 104, a general wide area network (WAN), and/or a public network (e.g., the Internet) via the network adapter 16. As depicted, the network adapter 16 communicates with the other components of the node 112 via bus. It should be understood that although not shown, other hardware and/or software components could be used in conjunction with the node 112. Examples include, but are not limited to: microcode, device drivers, redundant processing units, external disk drive arrays, RAID systems, tape drives, and data archival storage systems, etc. The node 112 may be interconnected with other node(s) via a host channel adapter (HCA) such as InfiniBand. (Note: the term(s) "InfiniB and" may be subject to trademark rights in various jurisdictions throughout the world and are used here only in reference to the products or services properly denominated by the marks to the extent that such trademark rights may exist.)

Hardware and/or software components of the tape library 130, the tape drives 132, the control terminal 140 may include, similar to the node 112 shown in FIG. 2, a processor, a memory, a read only memory, a network adopter, and an I/O interface, not shown in the drawings.

Figure 3:
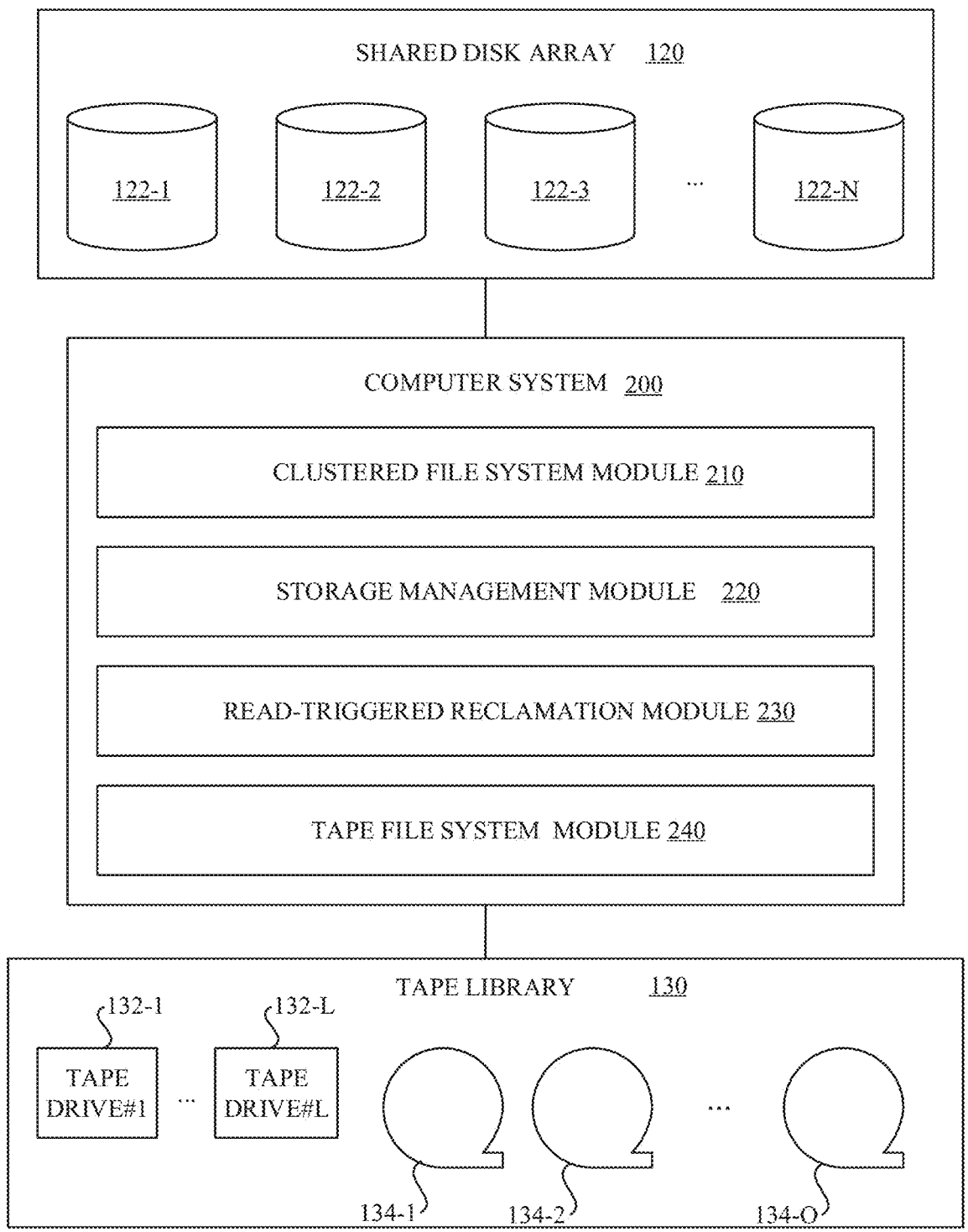
FIG. 3 illustrates a block diagram of the hierarchical storage system according to the example embodiment of the present invention.

Referring now to FIG. 3, a block diagram of the hierarchical storage system 100 is illustrated. As shown in FIG. 3, the hierarchical storage system 100 includes a computer system 200 connected to the shared disk array 120 and the tape library 130. The computer system 200 may include the nodes 112 in the cluster 110 shown in FIG. 1 and FIG. 2.

In the storage system with the tape tier, because new data may be appended to the tape medium and file deletions may just erase pointers to the data, there may be provided a reclamation function to free up tape space that is occupied by deleted files and may not be reused during normal operations.

As described above, during the standard reclamation process, two tape drives may be occupied for reading from a source tape medium and for writing to a destination tape medium. Thus, considerable drive occupation time may be required for the reclamation due to their sequential nature. Although time required for the standard reclamation may depend on the number of files, total size of the files, and positions of the files in the tape medium, it is known that the standard reclamation of 300 files of 10 MB spread over the entire tape medium may take three hours or more, for example. Therefore, there are needed methods, storage systems and computer program products capable of reducing drive occupation time dedicated for reclamations.

In one or more embodiments according to the present invention, a novel reclamation function is incorporated into the storage system. A process of the novel reclamation function is triggered by receiving a read request to a target file in the storage system. During the novel reclamation process, in response to receiving the read request to the target file, the computer system 200 determines whether the tape medium storing the target file meets a predetermined condition, and manages writing of the target file onto a destination tape medium if the tape medium, that is determined to store the target data, meets the predetermined condition.

By virtue of the novel reclamation function according to one or more embodiments of the present invention, the reading of the target data triggered by the read request can be diverted as a part of the reclamation. Thus, the drive occupation time dedicated for the reclamation can be reduced since at least portion of data in the storage system has been already reclaimed before the standard reclamation and no further reading for this data portion is necessary.

For this purpose, in the example embodiment, the computer system 200 includes a clustered file system module 210, a storage management module 220, a read-triggered reclamation module 230, and a tape file system module 240, as shown in FIG. 3.

The clustered file system module 210 may be a software component that manages the clustered file system in the hierarchical storage system. In the example embodiment, the clustered file system module 210 is configured to receive a read request from a requestor to target file (including also directories) in the hierarchical storage system 100 and respond the requested target file to the requestor of the read request. The requestor may be any application software or system software that can access the clustered file system.

The storage management module 220 may be a software component that provides integration of the clustered file system managed by the clustered file system module 210 with the tape file system managed by the tape file system module 240. The storage management module 220 manages migration and recall activities in the hierarchical storage system. The storage management module 220 enables migration of files from the clustered file system (the disk tier) to the tape tier and recall of the migrated files when the migrated files are accessed.

In the example embodiment, the storage management module 220 is configured to recall the target file from the tape tier to the disk tier if not the disk tier but the tape tier is determined to store the target file. During the recall of the target file, the storage management module 220 manages reading of the target file from the source tape medium and storing of the target file onto the disk tier.

The tape file system module 240 may be a software component that allows for performing file operations to the tape media and providing an interface to manipulate files on the tape media in the tape library 130. The tape file system module 240 may accesses space on the tape media through their file system interface and handles data as file objects and associated metadata. The tape library 130 is mounted entirely as a file system, and the tape media 134 in the tape library 130 may be accessed as subdirectories under a mount point of the tape library 130.

Functions including migration, premigration, recall, standard reclamation, and reconciliation in the hierarchical storage system will now be described.

Migration is a process in which files are moved from the clustered file system on disk tier to the tape media on the tape tier, which leaves behind a small stub file on the disk tier. Premigration is a process in which files are moved from the clustered file system on disk tier to the tape media on the tape tier without replacing the file body with stub file on the disk tier. Identical copies of the files are on the clustered file system and in the tape file system. Recall is a process in which the migrated files are moved from the tape media back to the originating clustered file system on disk tier.

The files newly added to or the files overwritten to the hierarchical storage system may initially be only on the disk tier, thus the file state is initially "resident". The file may be migrated to the tape tier by the migration process, after which the file is a stub on the disk and the IDs of the tapes storing the copies are written to metadata. The file state of such file is referred as "migrated". The file may be recalled from the tape tier by recall when an application attempts to read from the file. The file state of such file both on the disk and tape tiers is referred as "premigrated". Also, the file may be premigrated to the tape tier by running premigration process.

Reconciliation is a process in which clustered file system is synchronized with contents of the tape media and old and obsolete objects are removed from the tape medium. Reconciliation may be executed when files in the clustered file system are deleted, moved, or renamed.

Standard reclamation is a process in which a tape medium is defragmented. The process of the standard reclamation frees up space on a tape medium that is occupied by deleted files. The standard reclamation may be performed to the tape medium before the tape medium being removed or exported so as to ensure that no files remain on the tape medium when it is removed or exported.

The reconciliation and the standard reclamation are recommended to periodically schedule during off-peak hours for examples.

Hereinafter, the novel reclamation function according to the example embodiment of the present invention will be described in detail by referring FIG. 3-5.

The read-triggered reclamation module 230 may be a software component that provides the novel reclamation function according to the example embodiment of the present invention. The read-triggered reclamation module 230 is configured to perform processing of the read-triggered reclamation function in response to receiving the read request to the target file. During the processing, the read-triggered reclamation module 230 determines whether the source tape medium storing the target file meets the predetermined condition and manages writing of the target file onto a destination tape medium if the source tape medium meets the predetermined condition. After the target file is written on the destination tape medium, the read-triggered reclamation module 230 may manage to update metadata information of the target file in the hierarchical storage system so that the destination tape medium is pointed for the target file. The metadata information may be included in an mode of the clustered file system and/or an index of the tape file system.

The predetermined condition for the read-triggered reclamation may include a policy based on an attribute of the source tape medium. The attribute of the tape medium may include a generation of the tape medium, remaining capacity of the tape medium and/or utilization of the tape medium. For example, the reclamation processing for the target file may be performed merely when the source tape medium is an older generation than a predetermined threshold. For example, the reclamation processing for the target file may be performed merely when the source tape medium has remaining capacity lower than a predetermined threshold and/or utilization lower than a predetermined threshold. The remaining capacity may be defined as a percentage of available capacity to the total tape capacity of the tape medium. The utilization may be defined as a percentage of valid capacity for the valid files to the total tape capacity of the tape medium.

The read-triggered reclamation module 230 may be further configured to select the destination tape medium from among a tape media pool (or a "set" of tape media). In an embodiment, selection of the tape medium can be done based on the generation of the tape medium, timing of the read request, frequency of access to the target file, and/or frequency distribution of timing of access to the target file. For example, a tape medium with a latest generation can be selected as the destination tape medium. For instance, one or more tape media are prepared for each day of week and the destination tape medium can be selected by a day of week when the read request is issued. For instance, the destination tape medium can be selected so that more frequently accessed files are consolidated on specific tape medium for frequent access and less frequently accessed files are consolidated on other specific tape medium for less frequent access.

Figure 4:
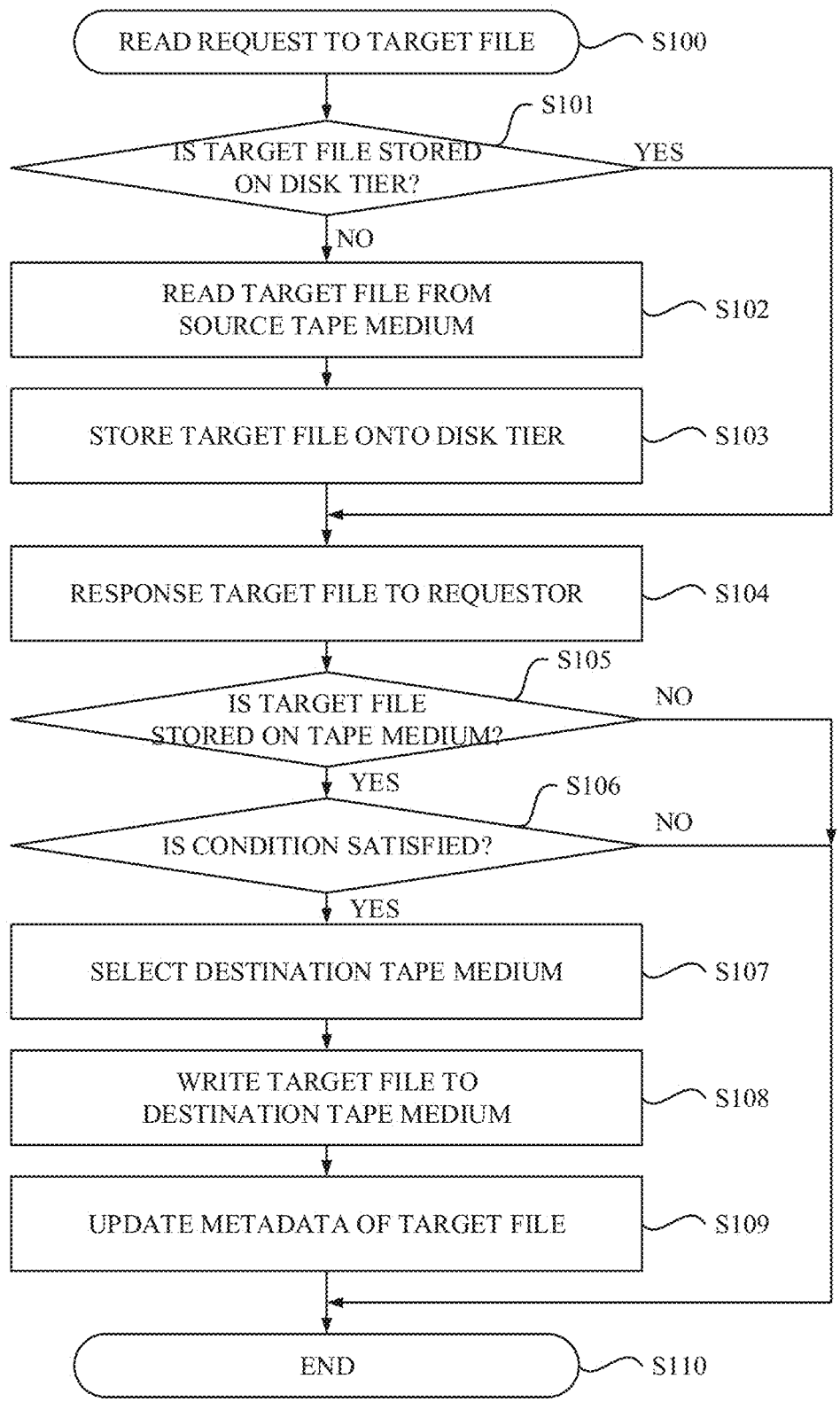
FIG. 4 is a flowchart depicting a novel reclamation process triggered by a read request according to the example embodiment of the present invention.

Referring to FIG. 4, a flowchart depicting the novel reclamation process triggered by the read request is shown. As shown in FIG. 4, process begins at step S100. Note that the process shown in FIG. 4 may be performed by the node 112 allocated to handle the read request in response to receiving the read request to the target file.

At step S101, the node 112 determines whether the requested target file is stored on the disk tier, by the clustered file system module 210. If the node 112 determines that the target file is not stored on the disk tier in step S101 (NO), then the process proceeds to step S102. When the file state of the target file is "migrated", the target file is determined to be not stored on the disk tier. At step S102, the node 112 manages to read the target file from the source tape medium by the tape file system module 240. If the recall of the target file is necessary, the storage management module 220 may be notified from the clustered file system module 210 to recall from the tape file system module 240.

At step S103, the node 112 stores the read target file onto the disk tier by the clustered file system module 210 that receives the read target file from the tape file system module 240 so as to complete a recall of the target file. Then the process proceeds to step S104. By the steps S102 and S113, the target file is recalled from the tape medium to the disk tier. After that, the application can access the file that is copied from the tape medium to the disk tier, similar to the way that it can access other files originally stored in the disk cache 122.

If the node 112 determines that the target file is stored on the disk tier in step S101 (YES), then the process proceeds directly to step S104. When the file state of the target file is "premigrated" or "resident", the target file is determined to be stored on the disk tier. At step S104, the node 112 responds to the requestor of the read request with the target file, by the clustered file system module 210.

At step S105, the node 112 determines whether the target file is being stored on the tape medium 134 by the clustered file system module 210. If the node 112 determines that the target file is not stored on the tape medium 134 in step S105 (NO), then the process proceeds directly to step S110 and ends at step S110. When the file state of the target file is "resident", the target file is determined to be not stored on the tape medium 134.

If the node 112 determines that the target file is stored on the tape medium 134 in step S105 (YES), then the process branches to step S106. When the file state of the target file is "migrated" or "premigrated", the target file is determined to be stored on the tape medium 134. The read-triggered reclamation module 230 may be notified from the clustered file system module 210 to perform further determination whether the reclamation processing is necessary for the target file.

At Step S106, the node 112 determines whether the predetermined condition is satisfied for the source tape medium that stores the target file, by the read-triggered reclamation module 230.

In a particular embodiment, the condition may be a policy based on the generation of the tape medium. If the generation of the source tape medium is older than the predetermined threshold of the generation, then the condition may be determined to be satisfied. In another particular embodiment, the condition may be a policy based on remaining capacity and utilization of the tape medium. If both the remaining capacity and utilization of the source tape medium are lower than the corresponding predetermined thresholds, respectively, then the condition may be determined to be satisfied. Presenting low remaining capacity in spite of low utilization indicates presence of a considerable amount of deleted files on the tape medium. Such tape medium may be preferred to be reclaimed.

If the node 112 determines that the predetermined condition is satisfied for the target file in step S106 (YES), then the process branches to step S107. At step S107, the node 112 selects the destination tape medium by the read-triggered reclamation module 230. In an embodiment, selection of the tape medium may be performed based on the generation of the tape medium, timing of the read request, frequency of access to the target file, and/or frequency distribution of timing of access to the target file.

At step S108, the node 112 manages to write the target file onto the destination tape medium by the tape file system module 240. The node 112 can utilize data of the target file on the memory that is stored in response to recalling of the target file if available. Otherwise, the node 112 can read from the disk tier. A time lag between occurrence of the read request and the actual writing of the target file may be allowed. Recalls may have higher priority than write operations for the read-triggered reclamation. If there is another recall request for a file on the tape medium that is being reclaimed, the writing is suspended for the recall. After the recall is complete, the reclamation process may resume to perform the writing of the target file.

At step S109, the node 112 updates metadata information of the target file. The metadata information in the hierarchical storage system is modified to point the destination tape medium in place of the source tape medium for the target file. Then, the process ends at step S110 and waits for a next read request. If the node 112 determines that the predetermined condition is unsatisfied in step S106 (NO), then the process branches directly to step S110.

Figure 5:
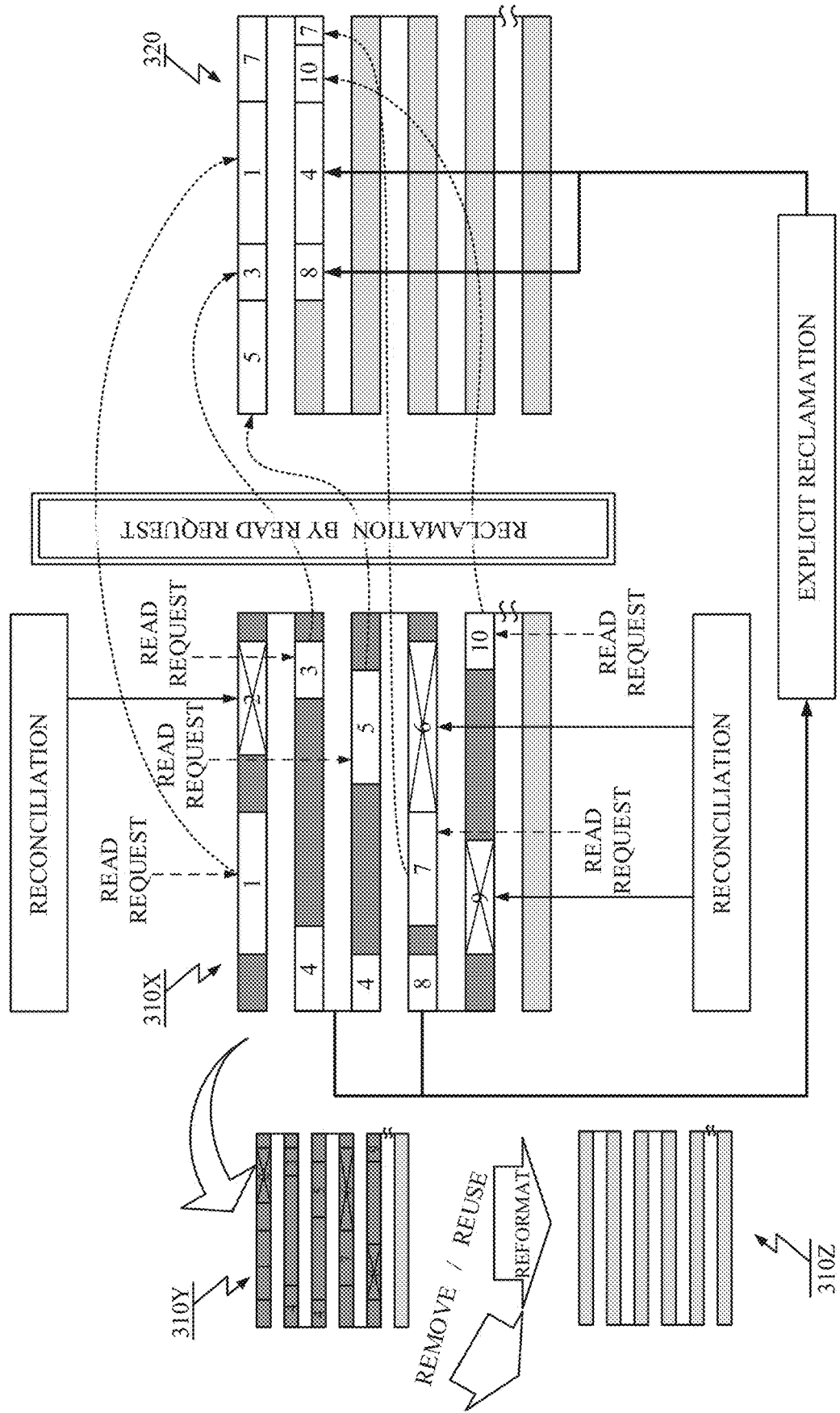
FIG. 5 illustrates schematically the novel reclamation process triggered by the read request according to the example embodiment of the present invention.

Referring to FIG. 5, the novel reclamation process triggered by the read request is schematically illustrated. In this example, a source tape medium 310X satisfies the predetermined condition because the generation of the source tape medium 310X is older than the predetermined threshold. Tape medium 320 is assumed to be selected for destination of each novel read-triggered reclamation processing and the explicit standard reclamation process. Of course, this is an example for convenience, and the destination tape medium may be selected each time that processing for the reclamation is performed.

In FIG. 5, light gray region represents free space on the tape medium. Dark gray region represents space occupied by deleted file and the white region represents space occupied by currently valid file. A number is assigned to each valid region for file identification, for convenience.

As shown in FIG. 5, valid files on the source tape medium 310X are reclaimed to the destination tape medium 320 one after another in response to receiving each read request. In this example, the files of "file-5", "file-3", "file-1", "file-7" and "file-10" are reclaimed by the read-triggered reclamation. The sequence of the reclamation processing for these files may not be dependent on the sequence of positions on the tape medium and may be dependent on the sequence of read request.

In many use cases, a retention period may be defined to each digital document for meeting legal data archival requirements. In such use case, files that are read, overwritten or created within a given period may be required to be stored persistently while files that are not accessed within the given period can be deleted due to expiration of data. In such case, obsolete files on the tape medium 310X, that are deleted from the clustered file system but still remains on the tape medium, can be deleted from the tape medium 310X by reconciling the tape medium 310X before the explicit standard reclamation. In this example, the files of "file-2", "file-6" and "file-9" are deleted by the reconciliation process.

By the standard reclamation to the tape medium 310X, remaining valid files on the tape medium 310X are reclaimed collectively, thereby obtaining a scratch tape medium 310Y. In this example, the remaining files of "file-4" and "file-8" are reclaimed by the standard reclamation process during off-peak hours for examples. The obtained scratch tape medium 310Y can be reused in the storage system or removed from the storage system. Reformatting of the scratch tape medium 310 Y can provide an empty tape medium 310Z for reuse.

Regarding the LTO format, tape drives are designed to support: (i) reading of data from a tape medium of the tape drive's own generation and two prior generations; and (ii) writing of data to a tape medium of the tape drive's own generation and one prior generation format. However, the tape drives are not capable of reading or writing of a tape medium in a format earlier than these generations. Therefore, the reclamation from an older-generation tape medium to a newer-generation tape medium may be requested for long term preservation of digital contents.

By virtue of the novel reclamation function according one or more embodiments of the present invention, in a particular use case where files that are not accessed within the given period are deleted, all necessary valid data can be persistently stored in the hierarchical storage system without the need for an explicit reclamation request to tape media.

Figure 6:
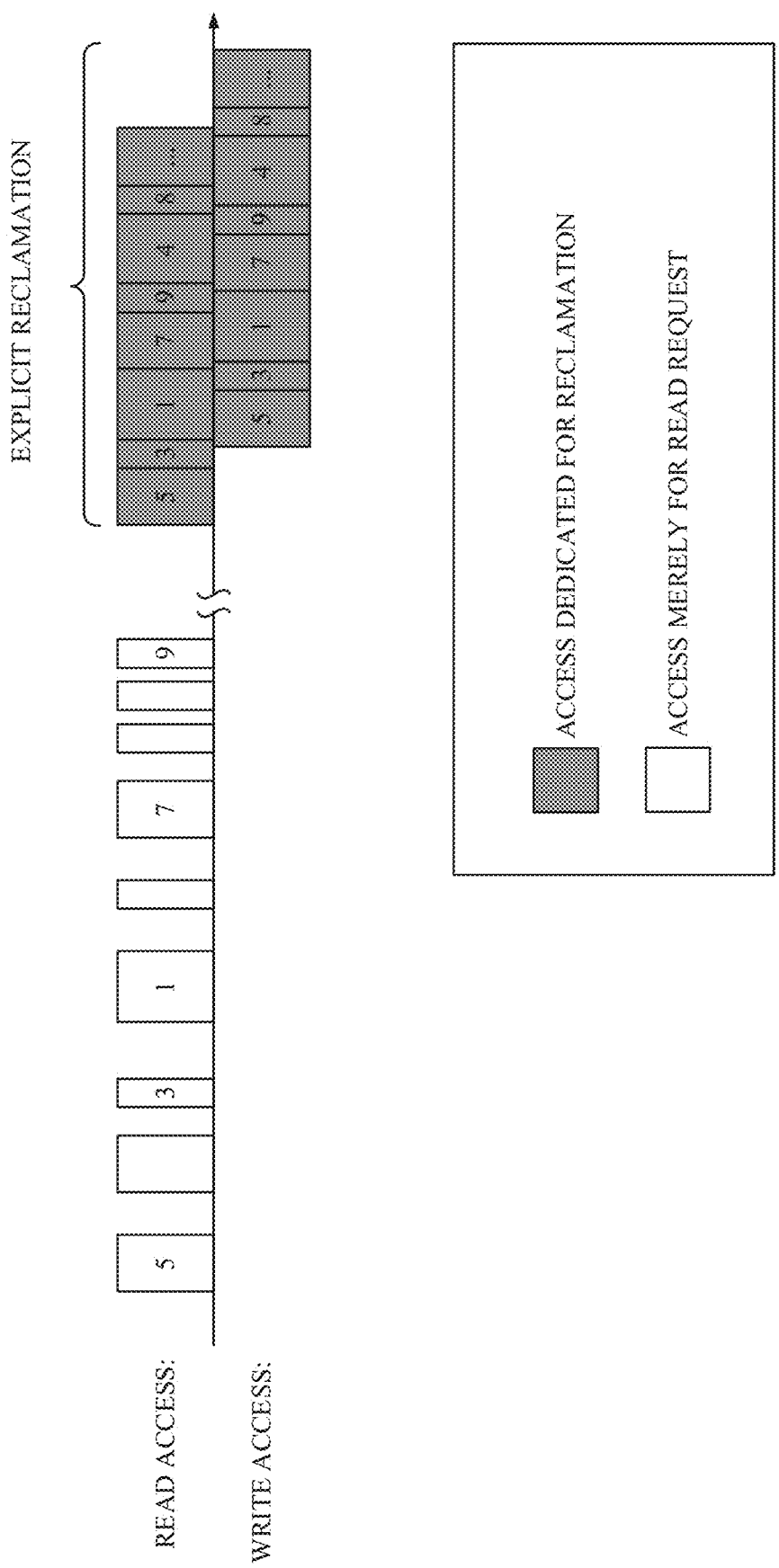
FIG. 6 illustrates occupation time required for an explicit standard reclamation process without performing the novel reclamation process.
Figure 7:
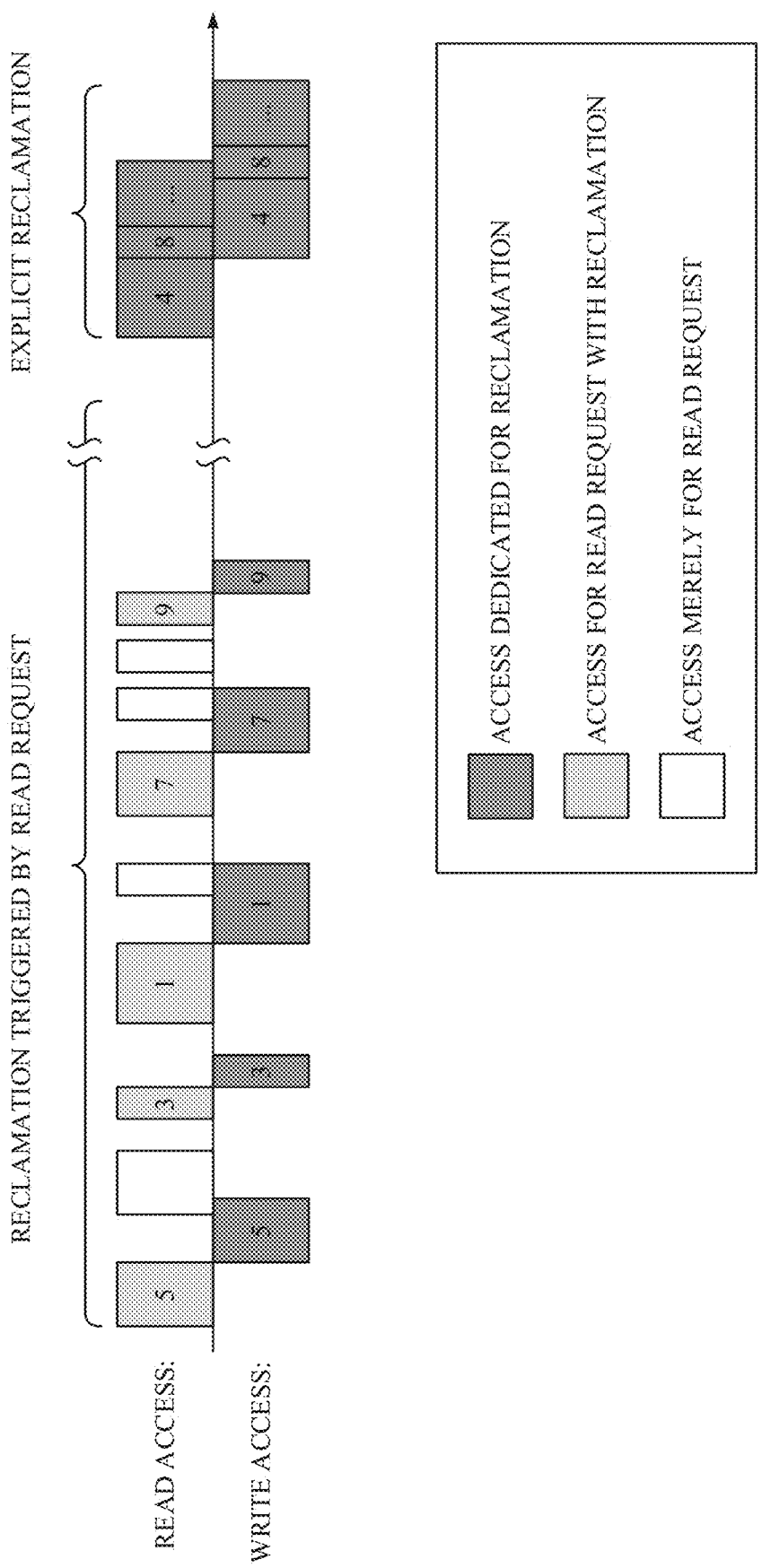
FIG. 7 illustrates occupation time required for the novel reclamation processes triggered by the read requests followed by the explicit standard reclamation process according to the example embodiment of the present invention.

Referring to FIG. 6 and FIG. 7, occupation time required for an explicit standard reclamation process without and with performing the novel reclamation process are illustrated, respectively. In FIG. 6 and FIG. 7, periods of read and write access are schematically illustrated along a time axis.

The period represented by white is corresponded to an access merely for a corresponding read request. The period represented by dark gray corresponds to an access dedicated for reclamation. The period represented by light gray corresponds to an access for both the read request and the novel read-triggered reclamation. A number is assigned to each period for file identification.

By comparing FIG. 7 with FIG. 6, the drive occupation time required for the explicit standard reclamation can be reduced by utilizing the reading of the target data in response to the read request as a part of the reclamation by using the novel read-triggered reclamation process according to one or more embodiment of the present invention. At least a portion of data in the hierarchical storage system may have been already reclaimed before the standard reclamation and no further reading for this data portion may be necessary. Also, overall drive occupation time required for all read operations may be shortened.

Even in the case where all files are persistently stored regardless of whether or not each file is accessed, the time required for the standard reclamation to a tape medium can be reduced.

As described above, the read request is described as the trigger for the novel reclamation and the destination tape medium is described as destination for the reclamation processing. However, as a matter of course, a tape medium other than the source tape media that meets a predetermined condition can be selected for destination to which newly created files or overwritten files in the storage system are migrated. Such placement and management policies may help to reduce the drive occupation time required to perform the explicit standard reclamation.

According to an embodiment of the present invention, there is provided a method for reclaiming a storage medium in a storage system by a computer system. The method comprises receiving a read request to target data in the storage system. The method comprises further reading the target data from a first storage medium that is determined to store the target data and responding the target data to a requestor of the read request. The method further comprises determining whether the first storage medium storing the target data meets a predetermined condition and writing the target data onto a second storage medium for reclamation in response to determining that the first storage medium meets the predetermined condition.

According to another embodiment of the present invention, there is provided a storage system for reclaiming a storage medium in the storage system. The storage system comprises a file system module configured to receive a read request to target data in the storage system and respond the target data to a requestor of the read request. The storage system comprises further a storage management module configured to manage reading of the target data from a first storage medium that is determined to store the target data. The storage system further comprises a reclamation module configured to determine whether the first storage medium storing the target data meets a predetermined condition in response to the read request and manage writing of the target data onto a second storage medium if the first storage medium meets the predetermined condition.

According to another embodiment of the present invention, there is provided a computer program product for reclaiming a storage medium in a storage system. The computer program product comprises a computer readable storage medium having program instructions embodied therewith. The program instructions comprise computer-executable program code to receive a read request to target data in the storage system. The program instructions comprise computer-executable program code to read the target data from a first storage medium that is determined to store the target data. The program instructions further comprise computer-executable program code to respond the target data to a requestor of the read request. The program instructions comprise computer-executable program code to determine whether the first storage medium storing the target data meets a predetermined condition. The program instructions further comprise computer-executable program code to write the target data onto a second storage medium for reclamation in response to determining that the first storage medium meets the predetermined condition.

In some embodiments, the method, storage system, and/or computer program product of the present invention further comprises updating metadata information of the target data in the storage system, in response to the writing, so as to point the second storage medium for the target data.

In some embodiments, the storage system is a hierarchical storage system that includes a tape tier having the first storage medium and the second storage medium, and one or more upper tiers above the tape tier, and the method further comprises: storing the target data onto at least one upper tier, in response to the reading, so as to complete a recall of the target data from the tape tier to the at least one upper tier.

In some embodiments, the predetermined condition includes a policy based on an attribution of the first storage medium storing the target data.

In some embodiments, the attribution of the first storage medium includes a generation of the first storage medium.

In some embodiments, the attribution of the first storage medium includes remaining capacity or utilization of the first storage medium.

In some embodiments, the method, storage system, and/or computer program product of the present invention further comprises selecting the second storage medium from among the storage medium pool based on a generation of the storage medium, timing of the read request, frequency of access to the target data, and/or frequency distribution of timing of access to the target data.

In some embodiments, the method, storage system, and/or computer program product of the present invention further comprises explicitly reclaiming the first storage medium storing remaining valid data thereon so as to create a scratch medium for reusing in the storage system or removing from the storage system, wherein a time required for the explicitly reclaiming is reduced by utilizing the reading of the target data in response to the read request as a part of the reclamation.

In some embodiments, the method, storage system, and/or computer program product of the present invention further comprises reconciling the first storage medium to delete an obsolete data, that is deleted from the storage system due to expiration of data, from the first storage medium before the explicitly reclaiming, thereby further reducing the time required for the explicitly reclaiming.

In some embodiments, the method, storage system, and/or computer program product of the present invention further comprises migrating a newly created data or an overwritten data in the storage system to a storage medium other than the first storage medium.

Hereinabove, one or more embodiments and aspects of the invention have been described with particular advantages, however, some embodiments may not have above mentioned potential advantages and these potential advantages are not necessarily required of all embodiments.

Computer Program Implementation

The present invention may be a computer system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for reclaiming a storage medium, the method comprising:
    determining, by one or more processors, that a first storage medium storing data in a linear tape file system (LTFS) format meets a predetermined condition indicating that the first storage medium should be reclaimed, wherein the predetermined condition is a policy based, at least in part, on a generation of the first storage medium and on a utilization of the first storage medium, and wherein the predetermined condition is met when the generation of the first storage medium is older than a first predetermined threshold and when a percentage of valid capacity for valid files to a total tape capacity of the first storage medium is below a second predetermined threshold;
    responsive to reading requested data from the first storage medium, and responsive to determining that the first storage medium meets the predetermined condition, writing, by one or more processors, the requested data to a second storage medium in the LTFS format, wherein the second storage medium is selected based, at least in part, on a generation of the second storage medium, wherein the generation of the second storage medium is newer than the generation of the first storage medium;
    subsequent to writing the requested data to the second storage medium, reconciling, by one or more processors, the first storage medium to delete expired data; and
    subsequent to reconciling the first storage medium, explicitly reclaiming, by one or more processors, remaining data on the first storage medium to the second storage medium in the LTFS format, wherein a time required for explicitly reclaiming is reduced due to the requested data having already been written to the second storage medium, and due to the deleted expired data not having to be written to the second storage medium.

2. The method of claim 1, further comprising:
    responsive to writing the requested data, updating, by one or more processors, metadata for the requested data to indicate that the requested data is stored on the second storage medium.

3. The method of claim 1, wherein the storage system is a hierarchical storage system that includes a tape tier having the first storage medium and the second storage medium, and one or more upper tiers above the tape tier in the hierarchical storage system.

4. The method of claim 3, further comprising:
    responsive to reading the requested data from the first storage medium, storing, by one or more processors, the requested data on at least one upper tier of the one or more upper tiers.

5. The method of claim 1, wherein the selection of the second storage medium is further based in part on timing of the read request, frequency of access to the requested data, or frequency distribution of timing of access to the requested data.

6. The method of claim 1, further comprising:
    migrating, by one or more processors, at least one of newly created data or overwritten data in the storage system to a storage medium other than the first storage medium.

7. The method of claim 1, wherein reconciling the first storage medium to delete expired data includes:
    identifying retention periods for digital documents stored on the first storage medium, wherein the retention periods are adapted to meet legal data archival requirements; and
    responsive to determining that a first digital document's respective retention period has expired, deleting the first digital document.

8. The method of claim 7, wherein the first digital document's respective retention period expires when the first digital document is not read, overwritten, or created within a given time period.

9. A computer program product for reclaiming a storage medium, the computer program product comprising a computer readable storage medium having stored thereon:
    program instructions to determine that a first storage medium storing data in a linear tape file system (LTFS) format meets a predetermined condition indicating that the first storage medium should be reclaimed, wherein the predetermined condition is a policy based, at least in part, on a generation of the first storage medium and on a utilization of the first storage medium, and wherein the predetermined condition is met when the generation of the first storage medium is older than a first predetermined threshold and when a percentage of valid capacity for valid files to a total tape capacity of the first storage medium is below a second predetermined threshold;
    program instructions to, responsive to reading requested data from the first storage medium, and responsive to determining that the first storage medium meets the predetermined condition, write the requested data to a second storage medium in the LTFS format, wherein the second storage medium is selected based, at least in part, on a generation of the second storage medium, wherein the generation of the second storage medium is newer than the generation of the first storage medium;
    program instructions to, subsequent to writing the requested data to the second storage medium, reconcile the first storage medium to delete expired data; and
    program instructions to, subsequent to reconciling the first storage medium, explicitly reclaim remaining data on the first storage medium to the second storage medium in the LTFS format, wherein a time required for explicitly reclaiming is reduced due to the requested data having already been written to the second storage medium, and due to the deleted expired data not having to be written to the second storage medium.

10. The computer program product of claim 9, the computer readable storage medium having further stored thereon:
program instructions to, responsive to writing the requested data, update metadata for the requested data to indicate that the requested data is stored on the second storage medium.

11. The computer program product of claim 9, wherein the storage system is a hierarchical storage system that includes a tape tier having the first storage medium and the second storage medium, and one or more upper tiers above the tape tier in the hierarchical storage system, and the computer readable storage medium having further stored thereon:
program instructions to, responsive to reading the requested data from the first storage medium, store the requested data on at least one upper tier of the one or more upper tiers.

12. The computer program product of claim 9, wherein the selection of the second storage medium is further based in part on timing of the read request, frequency of access to the requested data, or frequency distribution of timing of access to the requested data.

13. The computer program product of claim 9, the computer readable storage medium having further stored thereon:
program instructions to migrate at least one of newly created data or overwritten data in the storage system to a storage medium other than the first storage medium.

14. The computer program product of claim 9, wherein reconciling the first storage medium to delete expired data includes:
identifying retention periods for digital documents stored on the first storage medium, wherein the retention periods are adapted to meet legal data archival requirements; and
responsive to determining that a first digital document's respective retention period has expired, deleting the first digital document.

15. A computer system for reclaiming a storage medium, the computer system comprising:
a processor(s) set; and
a computer readable storage medium;
wherein:
the processor set is structured, located, connected and/or programmed to run program instructions stored on the computer readable storage medium; and
the stored program instructions include:
program instructions to determine that a first storage medium storing data in a linear tape file system (LTFS) format meets a predetermined condition indicating that the first storage medium should be reclaimed, wherein the predetermined condition is a policy based, at least in part, on a generation of the first storage medium and on a utilization of the first storage medium, and wherein the predetermined condition is met when the generation of the first storage medium is older than a first predetermined threshold and when a percentage of valid capacity for valid files to a total tape capacity of the first storage medium is below a second predetermined threshold;
program instructions to, responsive to reading requested data from the first storage medium, and responsive to determining that the first storage medium meets the predetermined condition, write the requested data to a second storage medium in the LTFS format, wherein the second storage medium is selected based, at least in part, on a generation of the second storage medium, wherein the generation of the second storage medium is newer than the generation of the first storage medium;
program instructions to, subsequent to writing the requested data to the second storage medium, reconcile the first storage medium to delete expired data; and
program instructions to, subsequent to reconciling the first storage medium, explicitly reclaim remaining data on the first storage medium to the second storage medium in the LTFS format, wherein a time required for explicitly reclaiming is reduced due to the requested data having already been written to the second storage medium, and due to the deleted expired data not having to be written to the second storage medium.

16. The computer system of claim 15, wherein the stored program instructions further include:
program instructions to, responsive to writing the requested data, update metadata for the requested data to indicate that the requested data is stored on the second storage medium.

17. The computer system of claim 15, wherein the storage system is a hierarchical storage system that includes a tape tier having the first storage medium and the second storage medium, and one or more upper tiers above the tape tier in the hierarchical storage system, and wherein the program instructions further include:
program instructions to, responsive to reading the requested data from the first storage medium, store the requested data on at least one upper tier of the one or more upper tiers.

18. The computer system of claim 15, wherein the selection of the second storage medium is further based in part on timing of the read request, frequency of access to the requested data, or frequency distribution of timing of access to the requested data.

19. The computer system of claim 15, wherein the stored program instructions further include:
program instructions to migrate at least one of newly created data or overwritten data in the storage system to a storage medium other than the first storage medium.

20. The computer system of claim 15, wherein reconciling the first storage medium to delete expired data includes:
identifying retention periods for digital documents stored on the first storage medium, wherein the retention periods are adapted to meet legal data archival requirements; and
responsive to determining that a first digital document's respective retention period has expired, deleting the first digital document.

* * * * *